United States Patent [19]

Maries et al.

[11] 4,060,401
[45] Nov. 29, 1977

[54] METHOD FOR MAKING ALIGNED FIBROUS CRYSTALS

[75] Inventors: Alan Maries, London; Philip Sydney Rogers, Rickmansworth, both of England

[73] Assignee: National Research Development Corporation, London, England

[21] Appl. No.: 672,599

[22] Filed: Apr. 1, 1976

[30] Foreign Application Priority Data

Apr. 2, 1975 United Kingdom ............... 13456/75

[51] Int. Cl.² ...................... C03B 32/00; C03B 31/00
[52] U.S. Cl. .......................................... 65/33; 65/103; 65/111; 65/DIG. 2; 65/DIG. 7; 156/620; 156/617 SP
[58] Field of Search ............... 65/33, DIG. 7, DIG. 2, 65/111, 102, 103; 156/620, 617 SP

[56] References Cited

U.S. PATENT DOCUMENTS

| | | | |
|---|---|---|---|
| 2,319,816 | 5/1943 | Land | 65/DIG. 2 |
| 2,683,676 | 7/1954 | Little et al. | 65/33 X |
| 3,218,143 | 11/1965 | Delajarte | 65/121 X |
| 3,232,716 | 1/1966 | Quast et al. | 156/620 UX |
| 3,351,433 | 11/1967 | Keller | 65/33 X |
| 3,660,062 | 5/1972 | Keller | 65/DIG. 7 |
| 3,798,007 | 3/1974 | Bochman et al. | 65/33 X |
| 3,799,836 | 3/1974 | Rogers et al. | 65/33 X |
| 3,881,945 | 5/1975 | Trojer et al. | 65/2 X |
| 3,944,640 | 3/1976 | Haggerty et al. | 65/2 X |
| 3,960,511 | 6/1976 | Kuhlmann-Schafer | 156/620 |
| 3,977,934 | 8/1976 | Lesk | 156/620 X |

OTHER PUBLICATIONS

Handbook of Glass Manufacture, vol. II, Fay V. Tooley, Ogden Pub. Co., New York, 1961, pp. 192-199.

*Primary Examiner*—S. Leon Bashore
*Assistant Examiner*—Frank W. Miga
*Attorney, Agent, or Firm*—Cushman, Darby & Cushman

[57] ABSTRACT

The invention relates to siliceous materials in the form of elements of aligned elongated individual crystals and more particularly to methods of forming such elements, said methods comprising providing a siliceous melt which will yield at the temperature of crystallization a primary crystalline phase which has a silicate chain structure, and drawing said melt, crystal nucleation having been induced, the rate of drawing being such as to cause continuous propagation of crystals of the said primary phase generally in the direction of drawing. The melt is drawn after crystal nucleation from an orifice, which can be directly or indirectly heated, of any desirable shape, such as circular, elongated or annular so as to result in the element being of cylindrical, sheet or tubular form or even of more complicated shape such as in cross-section to approximate to a turbine or compressor blade shape. Means may be provided to cause the element to disintegrate into units of a smaller number of aligned elongated crystals or even of single elongated crystals.

10 Claims, 1 Drawing Figure

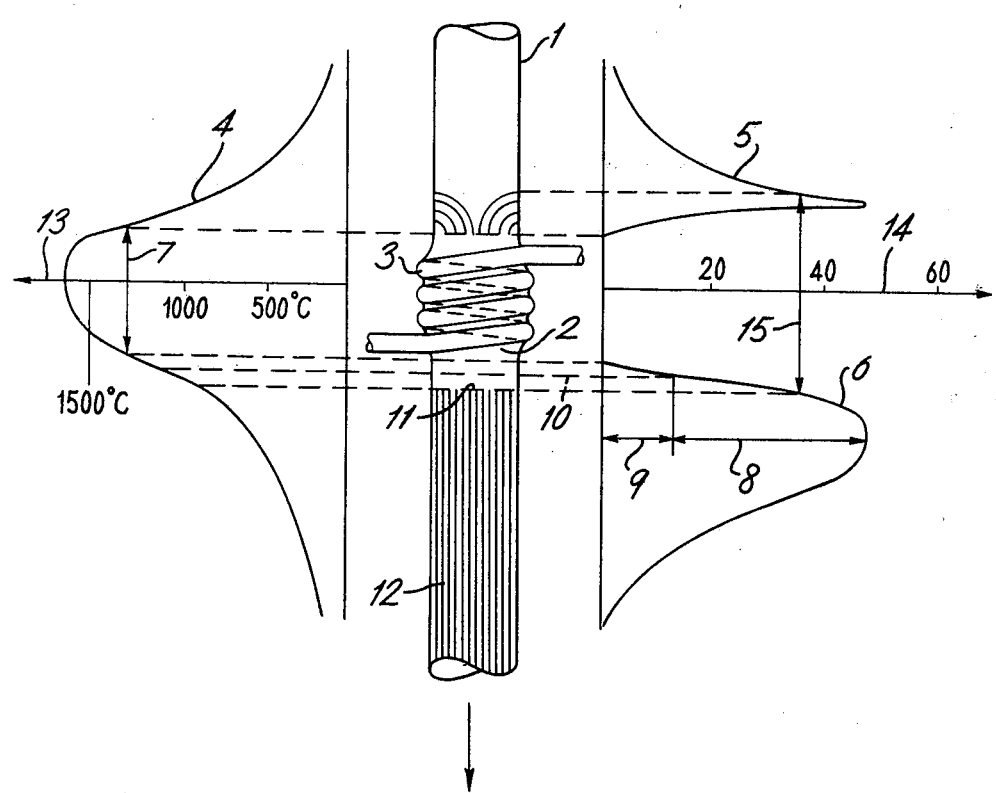

METHOD FOR MAKING ALIGNED FIBROUS CRYSTALS

This invention relates to siliceous materials and more particularly to methods of making fibrous crystals of siliceous materials.

In U.S. Pat. No. 3,799,836 there is described a method of devitrifying a silicate glass which yields an element comprising closely packed individual fibrous crystals lying in parallel relationship to one another.

In accordance with the present invention a method of producing an element comprising essentially aligned individual fibrous crystals comprises providing a siliceous melt which will yield at the temperature of crystallisation a primary crystalline phase which has a silicate chain structure, and drawing said melt, crystal nucleation having been induced, the rate of drawing being such as to cause continuous propagation of crystals of the said primary phase generally in the direction of drawing. By 'drawing' is meant herein that the element is formed either by pulling or by extrusion under pressure of the melt or under applied pressure or any combination of these.

Thus it will be seen that the fibrous crystalline element may be produced immediately from a melt of the siliceous material or a melt of the ingredients of the material.

It is a feature of the invention that the material of the fibrous crystalline element should, for example, be $\beta$-calcium metasilicate ($\beta$-CaSiO$_3$) i.e. similar to its mineral analogue, wollastonite. However, other suitable siliceous materials having a silicate chain structure will be apparent to those skilled in the art, such as:

| Fluor-pectolite | 2CaO . 3SiO$_2$ . NaF |
|---|---|
| Fluor-xonotlite | 5CaO . 6SiO$_2$ . CaF$_2$ |

The product of the invention may be used as a synthetic substitute for natural fibrous material, such as wollastonite, referred to, but the general fibre dimensions, the residual glass between the fibres and impurities will be under control in the synthetic material. It is envisaged that, during or after production of an element in accordance with the invention, the element may be manipulated or worked in some way to cause it to disintegrate into clumps of smaller numbers of elongated fibrous crystals or even into filamentary single crystals. It will be appreciated that it is possible to produce fibrous elements or clumps of fibrous crystals or individual fibrous crystals of substantial length by a process according to the invention.

One example of carrying the invention into effect will now be described by way of example with reference to the accompanying diagrammatic drawing; this will serve to clarify the nature of the invention.

A rod 1, of suitable composition to yield at the temperature of crystallisation a primary crystalline phase having a silicate chain structure, is prepared, say of 1 millimeter diameter; the diameter is not of importance, except insofar as the greater the diameter, the greater may be the difficulty of controlling alignment during crystallisation.

Suitable compositions are selected from the group consisting, in weight percent, of: (A) CaO 30%, SiO$_2$ 50%, ZnO 20%; (B) CaO 35%, SiO$_2$ 55%, ZnO 10%; (c) CaO 26%, MgO 2% Al$_2$O$_3$ 13%, SiO$_2$ 46%, ZnO 13%; and (D) CaO 42.5%, SiO$_2$ 50%, Na$_2$O 7.5%, which compositions are illustrative and are further described below.

The rod is used to feed a small zone 2 of molten material, which for convenience will be taken to be of composition A: CaO 30; SiO$_2$ 50 and ZnO 20 wt% but other suitable compositions are, for example, composition B: CaO 35; SiO$_2$ 55 and ZnO 10 wt%, composition C: CaO 26; MgO 2; Al$_2$O$_3$ 13 SiO$_2$ 46 and ZnO 13 wt%, and composition D: CaO 42.5; SiO$_2$ 50 and Na$_2$O 7.5 wt%. The presence of zinc oxide or sodium oxide is due to its effectiveness as a promoter of crystal growth. It may be that, in particular instances, other oxides than zinc oxide or sodium oxide or combinations of oxides will be found to be suitable.

The zone 2 is kept molten by resistive heating through a coil 3 for example of platinum.

In any case, the melt within the zone needs to be supported, for drawing, from an orifice which may be provided by a coil of metal, refractory or other suitable material, such as platinum or a platinum alloy, and this may be heated by radiation, resistive heating or by high frequency induction; that coil itself may form the support. The coil may, of course, be of a single turn in the form of a ring. Alternatively the melt and support may be heated by d.c. arc, flame-heating, dielectric heating or direct resistance heating utilising the glass itself as a resistive element or combinations of these. Thus in a preferred embodiment a metallic coil is used to both support and contact the melt, so as to surface restrain and align the melt as it crystallizes out in the form of aligned fiberous crystals.

In the example illustrated, the zone 2 is supported by the heating coil 3, and, when first formed, a platinum wire probe is introduced into the melt to commence the drawing of the melt and in so doing nucleation occurs across the section of the drawn element 12 and if the speed at which the melt is drawn is within the correct limits, the melt will crystallise out in the form of fibrous crystals of $\beta$-CaSiO$_3$, the crystals being formed substantially continuously and in substantially parallel relationship to each other and to the longitudinal axis of the element.

In the drawing there is appended an approximate temperature profile 4 through the molten zone for which the scale is indicated by axis 13; and the two curves 5 and 6 represent respectively growth rate profiles (a) for the rod 1 at entry to the molten zone, where surface nucleated crystals appear, (shown as curved lines in the drawing) these disappearing as the rod melts and (b) in the drawing stage after the molten zone and including the nucleating point for the fibrous crystals. The scale for growth rate is indicated at 14 in $\mu$m s$^{-1}$. The rate of travel of the rod is indicated by line 15. There are indicated, the liquidus temperature 7, the $\beta$-CaSiO$_3$ range 8, the $\alpha$-CaSiO$_3$ range 9, the $\alpha/\beta$-CaSiO$_3$ inversion temperature 10 and the crystal front 11.

It will be seen that if the rate of drawing is correctly adjusted, the $\beta$-CaSiO$_3$ crystals having been formed at the crystal front 11 of the drawn melt will grow continuously at this front so as to propagate in an aligned and fibrous habit; the crystal growth rate will be equal to the speed of travel of the drawing probe. This fibrous phase remains stable on cooling to form the element 12. For example, in the case of drawing a melt of Composition A a glass rod of diameter 1 mm is used, the heating coil is of diameter 1.0 mm formed from Platinum/13% Rhodium wire heated by passing an electric current through it. The temperature of the coil is controlled so that the glass is molten within it. The rate of passage through a coil is about 2.5 mm per minute but this can be varied to a certain extent. It appears that the maximum rate cannot exceed about 3.0 mm per minute.

Similarly in the case of drawing a melt of Composition D, a glass rod of the same diameter may be treated in the same apparatus but the rate of passage through the coil will be about 25 mm per minute though this rate can be extended possibly up to about 60 mm per minute; alternatively slightly lower rates may be possible. This will result in an element of crystallised form which is fibrous in structure. The correct rate of drawing may be found readily by trial and error with this form of apparatus, where the coil support 3 forming the resistance heated source of energy for melting the rod 1 is used. Use of this apparatus is limited, however, to preparation of comparatively small elements, say of about 1 mm diameter. It is possible to use the other forms of heating, above referred to, to enable elements of greater diameter to be prepared in fibrous crystalline form in accordance with the invention.

Examination by optical microscopy of thin sections of the fibrous elements of $\beta$-CaSiO$_3$ materials reveals that the crystals are in substantially parallel array right through the element with only a few percent residual glass remaining between crystals. The size of the crystals will be up to about 50 microns across but there will probably be a variation in size across a section of the element. It will probably be found to be beneficial to aim to produce as small a crystal size (in cross-section) as possible. Since this will depend to a large extent on the nucleation technique it will probably be preferable to arrange for the nucleation to produce the largest number of crystals as reasonably possible across the element. The elements fracture in a truly fibrous manner as can be observed at the fracture plane. By contrast with the fibrous nature of the $\beta$-CaSiO$_3$ material, $\alpha$-CaSiO$_3$ material derived from a rod of the same composition as the $\beta$-CaSiO$_3$ exhibits no fibrous characteristics and fractures in a glassy manner.

The comparative table below indicates the strengths of a number of materials when subjected to a 3-point bend strength test.

| Material | Rod (Element) Diameter (mm) | Modulus of Rupture (MNm$^{-2}$) | Young's Modulus (GNm$^{-2}$) |
|---|---|---|---|
| Vitreous silica rod | 0.92 | 190 | 65 |
| Borosilicate glass rod | 0.60 | 420 | 74 |
| Composition A Glass rod | 0.82 | 310 | 93 |
| $\alpha$- CaSiO$_3$ non-fibrous element (ex Composition A) | 1.15 | 320 | 91 |
| $\beta$- CaSiO$_3$ fibrous element (ex Composition A) | 1.03 | 540 | 124 |

The flexure test used for the completion of the above Table used a span of 15 mm between 4 mm diameter steel rollers and a cross-head speed of 0.1 mm per minute. The smaller diameter of the borosilicate glass rod may explain an unexpectedly high result for that material. The non-directional nature of the $\alpha$-CaSiO$_3$ material, referred to above, is evidenced by the similarity in both flexure strengths and modulus figures for this material and the base rod material.

It will be seen that the $\beta$-CaSiO$_3$ fibrous material possesses excellent properties. The quality of the $\beta$-CaSiO$_3$ product of the method of the invention also contrasts notably with that of rods crystallised conventionally by surface nucleated growth from solid glass of Composition A which are too delicate even for flexure tests to be carried out.

It would appear that variation in cross-sectional area of crystals of the fibrous element may be induced by altering parameters, such as drawing rate, during crystallisation, and that such variation may affect the strength and/or modulus of the element. Comparative studies on surface nucleated bulk crystalline material have indicated that longitudinal strengths should be at least three times transverse strengths in fibrous specimens.

Although the production of only single fibrous elements has been detailed above, it is evident that more than one element can be drawn from a melt, or if drawn from a crucible in which the material is melted, more than one nozzle or bushing can be provided as in the glass fibre industry and similar techniques can be utilised.

We claim:
1. A method of producing a rod which comprises essentially aligned individual fibrous crystals displaying a silicate chain structure, said method comprising the successive steps of:
   1. providing a rod of a siliceous material which when subjected to melting and drawing yields at its crystallization temperature a primary crystalline phase having a silicate chain structure, said siliceous material selected from the group consisting, by weight percent, of:
      a. CaO 30%, SiO$_2$ 50%, ZnO 20%;
      b. CaO 35%, SiO$_2$ 55%, ZnO 10%;
      c. CaO 26%, MgO 2%, Al$_2$O$_3$ 13%, SiO$_2$ 46%, ZnO 13%; and
      d. CaO 42.5%, SiO$_2$ 50%, Na$_2$O 7.5%;
   2. providing an orifice of a coil of metallic material;
   3. drawing said rod through said metallic coil and heating said rod to form a melt which melt is both supported by and in contact with said heated metallic coil such that the melt crystallizes out in the form of aligned fibrous crystals;
   4. drawing the rod and melt through said coil at a predetermined rate while concurrently:
      i. maintaining the melt in a molten condition as it is drawn through said heated coil by heating said coil, and
      ii. adjusting the rate of drawing to be within the speed of propagation of said crystalline phase through the melt, thereby
   forming fiberous crystals substantially continuously and in a substantially parallel relationship to both each other and the longitudinal axis of the rod.
2. A method as claimed in claim 1, wherein the said siliceous material is of composition CaO 30; SiO$_2$ 50 and ZnO 20 wt%.
3. A method as claimed in claim 1, wherein the said siliceous material is of composition CaO 35; SiO$_2$ 55 and ZnO 10 wt%.
4. A method as claimed in claim 1, wherein the said siliceous material is of composition CaO 26; MgO 2; Al$_2$O$_3$ 13; SiO$_2$ 46 and ZnO 13 wt%.
5. A method as claimed in claim 1, wherein the said siliceous material is of composition CaO 42.5; SiO$_2$ 50 and Na$_2$O 7.5 wt%.
6. A method as claimed in claim 1, wherein crystal nucleation is induced by application of a probe into said melt prior to drawing the rod and melt through said coil.

7. A method as claimed in claim 6, wherein said probe is of platinum or a platinum alloy.

8. A method as claimed in claim 1, wherein the orifice is heated by high frequency induction in the coil.

9. A method of producing a $\beta$-CaSiO$_3$ rod which comprises essentially aligned individual fibrous crystals displaying a silicate chain structure, said method comprising the successive steps of:
  1. providing a rod of a siliceous material which when subjected to melting and drawing yields at its crystallization temperature a primary crystalline phase having a silicate chain structure, said siliceous material selected from the group consisting, by weight percent, of:
     a. CaO 30%, SiO$_2$ 50%, ZnO 20%;
     b. CaO 35%, SiO$_2$ 55%, ZnO 10%;
     c. CaO 26%, MgO 2%, Al$_2$O$_3$ 13%, SiO$_2$ 46%, ZnO 13%; and
     d. CaO 42.5%, SiO$_2$ 50%, Na$_2$O 7.5%; and
  2. providing an orifice of a coil of metallic material;
  3. drawing said rod through said metallic coil and heating said rod to form a melt which melt is both supported by and in contact with said heated metallic coil such that the melt crystallizes out in the form of aligned fibrous crystals;
  4. drawing the rod and melt through said coil at a predetermined rate while concurrently:
     i. maintaining the melt in a molten condition as it is drawn through said heated coil by heating said coil, and
     ii. adjusting the rate of drawing to be within the speed of propagation of said crystalline phase through the melt, thereby
  forming $\beta$-CaSiO$_3$ fiberous crystals substantially continuously and in a substantially parallel relationship to both each other and the longitudinal axis of the rod.

10. A method as claimed in claim 1 wherein the orifice is heated by resistive heating of the metallic material itself.

* * * * *